United States Patent [19]
Rodaway et al.

[11] 3,755,232
[45] Aug. 28, 1973

[54] PREVULCANIZATION OF RUBBERS BY HYDROGEN PEROXIDE AND AN ACTIVATOR

[75] Inventors: Bruce K. Rodaway, Erdington, Birmingham; Kenneth O. Calvert, Sutton Coldfield, both of England

[73] Assignee: Dunlop Holdings Limited, London, England

[22] Filed: Sept. 8, 1970

[21] Appl. No.: 70,584

[30] Foreign Application Priority Data
Sept. 12, 1969 Great Britain.................. 45,017/69
Apr. 29, 1970 Great Britain.................. 20,499/70

[52] U.S. Cl. ....... 260/29.7 AT, 260/83.3, 260/85.1, 260/94.7 A, 260/96 R
[51] Int. Cl...... C08d 7/00, C08d 13/28, C08f 1/88, C08f 27/00
[58] Field of Search ............ 260/29.7 AT, 29.7 EM, 260/83.3, 85.1, 96 R, 94.7 A

[56] References Cited
UNITED STATES PATENTS
2,447,772  8/1948  Rust et al. .................. 260/29.7 AT
3,243,401  3/1966  Floyd.......................... 260/29.7 AT
2,927,100  3/1960  Canterino et al............ 260/29.7 AT

OTHER PUBLICATIONS

Ephraim, "Inorganic Chemistry" 4 Ed. Rev., pp. 410–514–518, 843 (Nordeman, 1943).

*Primary Examiner*—Morris Liebman
*Assistant Examiner*—P. N. Thomas, Jr.
*Attorney*—Stevens, Davis, Miller & Mosher

[57] ABSTRACT

A prevulcanized polymer latex is made by treating an unsaturated polymer in an aqueous medium with hydrogen peroxide and a hydrogen peroxide activator which does not encourage the decomposition of the hydrogen peroxide to produce molecular oxygen under the conditions of the treatment. The prevulcanized polymer latex may be used in latex applications such as in adhesives, coatings, carpet backings, dips, threads, tapes and foams, of which the following is a Specification.

14 Claims, No Drawings

PREVULCANIZATION OF RUBBERS BY HYDROGEN PEROXIDE AND AN ACTIVATOR

This invention relates to the production of prevulcanized polymer latices.

According to the present invention a method for the production of a prevulcanized polymer latex comprises treating an unsaturated polymer in an aqueous medium with hydrogen peroxide together with a hydrogen peroxide activator which does not encourage the decomposition of the hydrogen peroxide to produce molecular oxygen under the conditions of the treatment.

According to the present invention also there is provided a prevulcanized polymer latex when prepared by the method described in the immediately preceding paragraph.

By the term "prevulcanized polymer latex" there is meant a latex in which the polymer particles have been vulcanized and from which vulcanized films can be produced merely by drying.

The hydrogen peroxide may be conveniently employed as an aqueous solution of concentration 5 to 65 per cent by mass, e.g. 30 per cent by mass (100-volume hydrogen peroxide).

The activator may be an inorganic compound which yields a per-acid or per-salt by reaction with hydrogen peroxide in aqueous medium. For example, it may be an acidic or amphoteric inorganic oxide or a salt thereof. Examples of such activators are sodium and potassium salts such as the molybdates, tungstates, stannates, borates, pervanadates, metasilicates (preferably in conjunction with potassium hydroxide), aluminates and bicarbonates, lithium chloride and boric acid. The activator is suitably added to the unsaturated polymer as an aqueous solution or dispersion. The amount of such an activator employed may be as little as one millimole per mole of hydrogen peroxide. In some instances no activator need be added since the unvulcanized polymer latex may contain such an activator owing to its method of preparation.

Alternatively, the activator may be an organic compound which yields a per-acid or per-salt by reaction with hydrogen peroxide in aqueous medium. Examples of such an activator are formic acid, formaldehyde, and fluoroacetic acid. Such an activator may be conveniently formed in situ but may alternatively be preformed if desired. For example, performic acid may be formed by the reaction of formaldehyde with hydrogen peroxide, preferably in the molar ratio 1:2. The peracid so formed is present as one component of an equilibrium system comprising water, hydrogen peroxide, organic acid and organic per-acid.

The treatment of the unsaturated polymer may take place in air and may conveniently be performed at room temperature. Preferably the reaction is performed under conditions which minimise loss of oxygen. For example, when the treatment is performed on a natural rubber latex it has been found advantageous to include a small quantity (e.g. about 0.1 percent based on the polymer) of a metal ion complexing agent such as the disodium salt of ethylenediamine tetraacetic acid. This is to sequester the metal ions such as copper and manganese ions present in the latex which would otherwise cause the rapid decomposition of the hydrogen peroxide to molecular oxygen. This approach may be used whenever excessive foaming, which may be attributed to the presence of undesirable metallic contaminants, is encountered. Further, when an organic activator is employed the reaction is preferably performed under acidic conditions in order to minimise the decomposition of hydrogen peroxide to molecular oxygen.

Unsaturated polymers which may be treated by the method of this invention may suitably be rubbers, and examples of unsaturated polymers which may be treated are styrene/butadiene copolymers, ethylene/propylene/diene terpolymers, polybutadiene, polychloroprene, styrene/butadiene/vinylpyridine terpolymers, butadiene/acrylonitrile copolymers, isoprene/acrylonitrile copolymers, carboxylated styrene/butadiene copolymers and natural rubber.

Useful prevulcanized latices may be prepared by blending two or more unsaturated polymers together before or after treatment of at least one of the polymers by the method of the present invention. For example, one unsaturated polymer, e.g. a styrene/butadiene rubber, may be treated by the method of this invention and then blended with another unsaturated polymer, e.g. natural rubber. Alternatively a blend of two unsaturated polymers, e.g. styrene/butadiene rubber and natural rubber, may be treated by the method of this invention.

If desired, the prevulcanized polymer latices produced by the method of this invention may be formed by any of the usual techniques. For example, foaming may be achieved by means of hydrogen peroxide which is treated to liberate oxygen e.g. by means of an enzyme catalyst (Talalay process), or by a mechanical foaming technique.

The polymer latices treated according to this invention are found to have the properties of prevulcanized polymers latices. Moreover, it is found that prevulcanized polymer latices, especially foams, are capable of containing a very high proportion of a filler material without serious detriment to resiliency. The prevulcanized polymer latices often have enhanced strength properties and good compatibility with untreated latices.

If desired, the prevulcanized polymer latices may be further vulcanized by the use of conventional sulphur-containing vulcanizing ingredients e.g. sulphur itself. Also, the prevulcanized polymer latices may be reacted with reactive compounds such as isocyanates and aldehyde resins e.g. resorcinol/formaldehyde resins, if desired.

Prevulcanized polymer latices prepared according to this invention form coherent films with good tensile properties and may be used to advantage in a wide variety of latex processes, for example in adhesives and coatings and in the manufacture of carpet backings, dipped articles, threads, tapes and spread and moulded foams.

The invention is illustrated in the following Examples:

EXAMPLE I 1 litre of a 68 percent total solids latex of a styrene/butadiene rubber containing 25 percent styrene by mass (trade name Intex 100) was mixed with two parts by weight of sodium lauryl sulphate and two parts by weight of Pluronic F68 (a condensate of ethylene oxide and a hydrophobic base produced by condensing propylene oxide and propylene glycol, available from Wyandotte Chemicals Corp.) per 100 parts by weight of rubber, and 60 ml of 100-volume hydrogen peroxide together with 0.5 g of potassium molybdate as a 5 percent aqueous solution were added. After about four hours at room temperature (about 20° C.) the resulting prevulcanized polymer latex was compounded as shown in Table I.

TABLE I

|  | Part(s) by weight (wet) |
|---|---|
| Prevulcanized polymer latex | 200 |
| 50% Aqueous zinc oxide | 6 |
| 50% Aqueous zinc diethyldithio-carbamate (antioxidant) | 1 |
| MS 200 Silicone oil | 0.7 |
| 50% Aqueous Trimene base (foam stabilizer) | 2 |
| Aluminium silicate | 100 (dry) |

Trimene base is a reaction product of ethyl chloride, formaldehyde and ammonia. The compounded polymer latex was foamed mechanically and 4 ml of a 20 percent aqueous ammonium acetate (heat-gelling agent) solution were stirred in. The foam was spread on a hessian sheet to a depth of 1 cm and was gelled by heating with infra-red radiation. After drying at room temperature (about 20° C.) the foam showed good recovery from indentation. In fact, even when wet, the foam could be cut with scissors without any permanent deformation of the cut edge.

EXAMPLE II 100 g portions of a 68 percent total solids latex of a styrene/butadiene rubber containing 25 percent styrene by mass (trade name Intex 100) were treated with 0.05 g of potassium molybdate and 0, 2, 4, 6, 8 or 10 ml of 100-volume hydrogen peroxide at room temperature (about 25° C.). When the reaction was complete, as judged by the disappearance of the pink coloration of the latex caused by the presence of the permolybdic salt, a film of each latex about 0.5 mm deep was spread on a glass plate. The films were dried in air at room temperature until clear. A weighed portion of each film was then swollen in toluene at 30° C. for 24 hours. The swollen films were weighed and the volume swelling and cross-link density calculated. The results of these tests are given in Table II.

TABLE II

| experiment No. | ml $H_2O_2$ | volume swelling | Cross-link Density $M_c^{-1} \times 10^{-4}$ |
|---|---|---|---|
| 1 | 0 |  | Dissolved |
| 2 | 2 | partially dissolved |  |
| 3 | 4 | 17.65 | 0.17 |
| 4 | 6 | 15.70 | 0.20 |
| 5 | 8 | 13.45 | 0.27 |
| 6 | 10 | 10.79 | 0.39 |

EXAMPLE III

To 100 g portions of a 68 percent total solids latex of a styrene/butadiene rubber containing 25 percent styrene by mass (trade name Intex 100), stabilized with three parts by weight of sodium lauryl sulphate per 100 parts by weight of rubber, were added hydrogen peroxide and formaldehyde in the molar ratio 2:1 in the quantities shown in Table III. The reagents were used as 10 Molar solutions. After 48 hours at room temperature (about 25° C.), a film of each latex about 0.5 mm deep was spread on a glass plate and dried in air. A weighed portion of each film was then swollen in toluene at 30° C. for 24 hours. The swollen films were weighed and the volume swelling and cross-link density calculated. The results of these tests are given in Table III.

TABLE III

| experiment No. | ml 10M $H_2O_2$ | ml 10M $CH_2O$ | volume swelling | cross-link density $M_c^{-1} \times 10^{-4}$ |
|---|---|---|---|---|
| 7 | 0 | 0 |  | dissolved |
| 8 | 12 | 6 | 17.57 | 0.17 |
| 9 | 16 | 8 | 14.17 | 0.24 |
| 10 | 20 | 10 | 13.54 | 0.26 |

The films prepared from the prevulcanized latices of Examples II and III were rubbery and showed a considerable improvement in strength and resilience over similar films cast from the untreated latex.

EXAMPLE IV

A styrene/butadiene rubber containing 25 percent styrene by mass, in the form of a 10 percent solution in toluene, was treated with hydrogen peroxide and activator in the proportions of Experiment No. 4 in Example II and Experiment No. 9 in Example III. There was no evidence of cross-linking in the polymer solution, i.e., the solution did not gel and the polymer recovered by evaporation of the solvent showed no obvious difference from the polymer recovered from an untreated solution.

EXAMPLE V

To 18 litres of a 68 percent total solids latex of a styrene/butadiene rubber containing 25 percent styrene by mass (trade name Intex 100), contained in a stainless steel reaction vessel jacketted at 16° C, were added 9 g of sodium tungstate (as a 5 percent aqueous solution) and 1,080 ml of 100-volume hydrogen peroxide. The mixture was gently stirred for 24 hours while the reaction proceeded. One part by weight of potassium oleate per 100 parts by weight of rubber was added to the resulting prevulcanized latex.

A film about 1.5 mm thick was prepared from the latex by casting it in a stainless steel mould and drying in air a room temperature. Three test-pieces from the dried film were tested at a rate of elongation of 50 cm per minute after conditioning for a minimum of 24 hours in an atmosphere of controlled temperature and humidity. Three test-pieces from the untreated latex were prepared and tested in identical manner. The results of these tests are given in Table IV.

TABLE IV

|  | Prevulcanized latex | Untreated latex |
|---|---|---|
| Modulus ($kg/cm^2$) at extension of: |  |  |
| 100% | 7.1 | 6.2 |
| 300% | 8.9 | 3.9 |
| 500% | 10.9 | - |
| Elongation-at-break (%) | 530 | 330 |
| Tensile strength ($kg/cm^2$) | 11.6 | 6.2 |

The test-pieces from the untreated latex started to flow plastically at 100 percent elongation and yielded at the elongation-at-break quoted, whereas the test-pieces from the prevulcanized latex did not flow plastically and snapped at the elongation-at-break stated.

EXAMPLE VI

One litre of a 65 percent total solids latex of a reinforced styrene/butadiene rubber containing 36 percent styrene by mass was treated with 10 ml of 5 percent sodium tungstate solution and 60 ml of 100-volume hydrogen peroxide at room temperature (about 20° C). Ten days later dried films were prepared from both the resulting prevulcanized latex and the untreated latex and tested as in Example V. The results of these tests are given in Table V.

TABLE V

| Modulus (kg/cm$^2$) at extension of: | Prevulcanized latex | Untreated latex |
|---|---|---|
| 100% | 6 | 10 |
| 300% | 8 | 7 |
| 500% | 11 | 5 |
| Elongation-at-break (%) | 1150 | 1100 |
| Tensile Strength (kg/cm$^2$) | 59 | 10 |

The test-pieces from the untreated latex started to flow plastically at about 100 percent elongation and subsequently yielded, whereas the test-pieces from the prevulcanized latex did not flow plastically and snapped at the elongation-at-break stated.

EXAMPLE VII

To illustrate that the prevulcanized latex may be further vulcanized by the use of conventional sulphur-containing vulcanizing ingredients, the prevulcanized latex of Example VI was compounded as shown in Table VI.

TABLE VI

| Polymer (as latex) | Part(s) by weight (dry) |
|---|---|
| Polymer (as latex) | 100 |
| Potassium oleate (15%) | 5 |
| Sulphur (50%) | 1.5 |
| Sym. di-beta-naphthyl-p-phenylene diamine (50%) | 1 |
| Zinc mercaptobenzthiazole (50%) | 1 |
| Zinc dibutyldithiocarbamate (50%) | 0.5 |
| Trimene base (50%) | 0.5 |
| Zinc oxide (50%) | 3 |
| Ammonium chloride (20%) | 6 |

Trimene base is a reaction product of ethyl chloride, formaldehyde and ammonia.

The ingredients were added as aqueous dispersions or solutions. The figure given in brackets after the ingredient indicates the proportion by weight of dry ingredient in the dispersion or solution.

The compounded latex was diluted to 30 percent polymer content and cast into a stainless steel mould about 1.5 mm deep. The mould was placed in steam at 100° C for 2 minutes to gel the compounded latex. The gelled film was leached in running water, dried at room temperature and heated in steam at 100° C for 10 minutes. The resulting film was tested as in Example V and the results are given in Table VII.

The untreated latex of Example VI was also compounded to the formulation given in Table VI and a dried, gelled film was prepared in the same manner as for the prevulanized latex. This film was heated in steam at 100° C for 90 minutes (the time required to obtain maximum tensile strength). The resulting film was tested as in Example V and the results are given in Table VII.

TABLE VII

| | Prevulcanized latex | Untreated latex |
|---|---|---|
| Tensile strength (kg/cm$^2$) | 125 | 66 |
| Elongation-at-break (%) | 730 | 510 |

EXAMPLE VIII

Two litres of a 31 percent total solids latex of a styrene/butadiene rubber containing 25 percent styrene by mass (trade name Intex F28) were treated with 10 ml of 5 percent sodium tungstate solution and 55 ml of 100-volume hydrogen peroxide at room temperature (about 20° C). Five days later the pH of the resulting prevulcanized latex was adjusted to 9.7 by the addition of 10 percent potassium hydroxide solution. Dried films were prepared from both the prevulcanized latex and the untreated latex and tested as in Example V. The results of these tests are given in Table VIII.

TABLE VIII

| | Prevulcanized latex | Untreated latex |
|---|---|---|
| Modulus (kg/cm$^2$) at extension of: | | |
| 100% | 5 | 6 |
| 300% | 7 | 8 |
| 500% | 9 | - |
| Elongation-at-break (%) | 880 | 410 |
| Tensile strength (kg/cm$^2$) | 23 | 9 |

EXAMPLE IX 500 g of a polybutadiene latex containing 58 percent total solids (trade name Polysar Latex 710) were treated with 5 ml of 5 percent sodium tungstate solution and 25 ml of 100-volume hydrogen peroxide at room temperature (about 20° C). Four days later dried films were prepared from both the resulting prevulcanized latex and the untreated latex and tested as in Example V.

The test-pieces from the untreated latex flowed during extension and yielded at an elongation of about 500 percent, whereas the test-pieces from the prevulcanized latex did not flow and broke with a tensile strength of 10 kg/cm$^2$ at an elongation of 890 percent.

EXAMPLE X 500 g of a polychloroprene latex containing 58 percent total solids (trade name Neoprene Latex 650) were treated with 4 ml of 5 percent sodium tungstate solution and 12.5 ml of 100-volume hydrogen peroxide at room temperature (about 20° C), Two days later dried films were prepared from both the resulting prevulcanized latex and the untreated latex and tested as in Example V. The results of these tests are given in Table IX.

TABLE IX

| | Prevulcanized latex | Untreated latex |
|---|---|---|
| Modulus (kg/cm$^2$) at extension of: | | |
| 100% | 9 | 9 |
| 300% | 13 | 13 |
| 500% | 23 | 25 |
| Elongation-at-break (%) | 920 | 640 |
| Tensile strength (kg/cm$^2$) | 91 | 36 |

EXAMPLE XI 500 g of a vinylpyridine/styrene/butadiene terpolymer latex containing 41 percent total solids (trade name Dunlop Vinyl Pyridine Latex) were treated with 3 ml of 5 percent sodium tungstate solution and 10 ml of 100-volume hydrogen peroxide at room temperature (about 20° C). Two days later dried films were prepared from both the resulting prevulcanized latex and the untreated latex and tested as in Example V.

The test-pieces from the untreated latex yielded at an elongation of 850 percent with a tensile strength of only 2 kg/cm$^2$, whereas the test-pieces from the prevulcanized latex broke at an elongation of 1,075 percent with a tensile strength of 7 kg/cm$^2$.

EXAMPLE XII

One litre of a 62 percent total solids latex of a butadiene/acrylonitrile rubber containing 34 percent acrylonitrile by mass (trade name Polysar Latex 762) was treated with 5 ml of 20 percent potassium hydroxide solution, 10 ml of 5 percent sodium tungstate solution and 40 ml of 100-volume hydrogen peroxide at room temperature (about 20° C). Two weeks later dried films were prepared from both the prevulcanized latex and the untreated latex. The dried films were heated in steam at 100° C for one hour, re-dried at room temperature and tested as in Example V. The results of these tests are given in Table X.

TABLE X

| | Prevulcanized latex | Untreated latex |
|---|---|---|
| Modulus (kg/cm$^2$) at extension of: | | |
| 100% | 7 | 7 |
| 300% | 7 | 6 |
| 500% | 7 | 4 |
| Elongation-at-break (%) | 1600 | 1600 |
| Tensile strength (kg/cm$^2$) | 20 | 9 |

The test-pieces from the untreated latex flowed and yielded, whereas the test-pieces from the prevulcanized latex did not flow and snapped at the elongation-at-break stated.

EXAMPLE XIII

To illustrate further the range of inorganic activators which may be used in the invention, the untreated latex of Example V was treated with the materials stated in Table XI. In each case the activator was added in aqueous medium and dried films were prepared from the resulting prevulcanized latex and tested as in Example V. The results of these tests are given in Table XI, in which EB represents the elongation-at-break and TS denotes the tensile strength of the dried film.

TABLE XI

| Additions per 1 kg of untreated latex | | Properties of dried film. | |
|---|---|---|---|
| Activator | 100-volume H$_2$O$_2$ | EB (%) | TS (kg/cm$^2$) |
| 10 ml 5% sodium stannate | 50 ml | <1600 | 26* |
| 20 ml saturated sodium borate (saturated at 25°C) | 50 ml | 1330 | 33 |
| 20 ml 5% lithium chloride | 40 ml | 1560 | 27 |
| 10 ml 5% sodium pervanadate | 60 ml | 120 | 29 |
| 10 ml 10% potassium bicarbonate | 50 ml | >1600 | 17* |
| 20 ml 5% sodium metasilicate (plus 15 ml 10%KOH) | 50 ml | >1600 | 11* |
| 20 ml 5% sodium aluminate | 25 ml | 530 | 17 |

*Modulus at 1600% elongation.

These results show a marked improvement over the properties of dried films prepared from the untreated latex. The test-pieces from the prevulcanized latices did not flow plastically.

EXAMPLE XIV 100 g of a 41 percent total solids latex, pH 11.2, of an ethylene/propylene/dicyclopentadiene terpolymer containing 26 percent dicyclopentadiene were treated with 1 ml of 5 percent sodium tungstate solution and 2 ml of 100-volume hydrogen peroxide at room temperature (about 20° C). Three days later dried films were prepared from both the resulting prevulcanized latex and the untreated latex and tested as in Example V. The results of these tests are given in Table XII.

TABLE XII

| | Prevulcanized latex | Untreated latex |
|---|---|---|
| Modulus (kg/cm$^2$) at extension of: | | |
| 100% | 11 | 8 |
| 300% | 27 | 20 |
| Elongation-at-break (%) | 460 | 460 |
| Tensile strength (kg/cm$^2$) | 58 | 34 |

EXAMPLE XV

One litre of a carboxylated styrene/butadiene rubber latex containing 54 percent total solids (trade name Politone 1097) was treated with 10 ml of 5 percent sodium tungstate solution and 50 ml of 100-volume hydrogen peroxide at room temperature (about 20° C). Dried films were prepared from both the resulting prevulcanized latex and the untreated latex and tested as in Example V. The results of these tests are given in Table XIII.

TABLE XIII

| | Prevulcanized latex | Untreated latex |
|---|---|---|
| Modulus (kg/cm$^2$) at extension of: | | |
| 100% | 8 | 7 |
| 300% | 10 | 10 |
| 500% | 16 | 15 |
| Elongation-at-break (%) | 980 | 1010 |
| Tensile strength (kg/cm$^2$) | 58 | 41 |

EXAMPLE XVI

One litre of a natural rubber latex containing 60 percent dry rubber and 0.7 percent ammonia was treated with 20 ml of a 5 percent solution of the di-sodium salt of ethylenediamine tetra-acetic acid, 10 ml of 5 percent sodium tungstate solution and 50 ml of 100-volume hydrogen peroxide at room temperature (about 20° C). Dried films were prepared from both the resulting prevulcanized latex and the untreated latex and tested as in Example V. The results of these tests are given in Table XIV.

TABLE XIV

| | Prevulcanized latex | Untreated latex |
|---|---|---|
| Tensile strength (kg/cm$^2$) | 124 | 78 |
| Elongation-at-break (%) | 1060 | 870 |

EXAMPLE XVII

One litre of the untreated styrene/butadiene rubber latex of Example V was treated with 10 ml of 5 percent sodium tungstate solution and 50 ml of 100-volume hydrogen peroxide at room temperature (about 20° C). The treated latex was blended with an equal weight of dry rubber of a natural rubber latex containing 60 percent dry rubber, 0.2 percent ammonia and 0.25 percent boric acid (Blend A). A second blend was prepared (Control Blend) by mixing equal weights of dry rubber of the untreated latex of Example V and the untreated natural rubber latex used in Blend A. One litre of the Control Blend was treated with 50 ml of 100-volume hydrogen peroxide at room temperature (Blend B). Dried films were prepared from Blend A, the Control Blend and Blend B and tested as in Example V. The results of these tests are given in Table XV.

TABLE XV

|  | blend A | control blend | Blend B |
|---|---|---|---|
| Tensile strength (kg/cm²) | 54 | 14 | 35* |
| Elongation-at-break (%) | 1220 | 1080 | >1700 |

*Modulus at 1700% elongation.

The results in Table XV illustrate the improvement obtained by treating the latex blend (in which case the hydrogen peroxide-activator was boric acid present in the natural latex) or by treating the styrene/butadiene rubber latex component prior to blending with natural latex.

EXAMPLE XVIII

To 1 kg of the untreated latex of Example VI were added 10 ml of 5 percent sodium tungstate solution and 10 ml of 100-volume hydrogen peroxide. Further incremental additions of 10 ml of 100-volume hydrogen peroxide were made on each of the following two days. The reaction was performed throughout at 31° C and the latex mixture was gently stirred for seven hours after each hydrogen peroxide addition.

Dried films were prepared from the resulting prevulcanized latex and tested as in Example V. The results of these tests are given in Table XVI.

TABLE XVI

| Modulus (kg/cm²) at extension of: |  |
|---|---|
| 100% | 7 |
| 300% | 8 |
| 500% | 10 |
| Elongation-at-break (%) | 1100 |
| Tensile Strength (kg/cm²) | 30 |

EXAMPLE XIX

One kg of a 40 percent total solids latex of a styrene/butadiene rubber containing 24 percent styrene by mass (trade name Pliolite 2108) was treated with 25 ml of 100-volume hydrogen peroxide and 20 ml of saturated sodium borate solution at room temperature (about 20° C). The following day the resulting prevulcanized latex was compounded as shown in Table XVII and water was added to adjust the total solids content to 20 percent.

TABLE XVII

|  | Parts by weight (dry) |
|---|---|
| Prevulcanized polymer latex | 100 |
| Resorcinol | 11 |
| Formaldehyde (37% aqueous solution) | 6 |
| Sodium hydroxide (10% aqueous solution) | 0.6 |

The compounded latex was matured for 24 hours at 23° C. Nylon cord (2/1260 denier) was then dipped in the compounded latex and dried for 2 minutes at 160° C. A typical compound for tyre casings was used to prepare pull-through test-pieces for the determination of the adhesion performance of the latex, the cure being 25 minutes at 150° C and the bonded cord length being 1 cm. Ten tests were carried out.

The untreated styrene/butadiene rubber latex and an untreated vinylpyridine terpolymer latex were compounded and evaluated in identical manner. The mean results of the tests are given in Table XVIII.

TABLE XVIII

|  | Force required (kg/cm) |
|---|---|
| Prevulcanized latex | 15.5 |
| Untreated styrene/butadiene rubber latex | 10.8 |
| Untreated vinylpyridine terpolymer latex | 14.9 |

EXAMPLE XX 4 kg of the untreated styrene/butadiene rubber latex of Example V were treated with 40 ml of 5 percent sodium tungstate solution and 240 ml of 100-volume hydrogen peroxide with gentle stirring at room temperature (about 20° C). The following day 50 ml of 10 percent potassium hydroxide solution were added to the resulting prevulcanized latex which was then compounded as shown in Table XIX.

TABLE XIX

|  | Parts by weight (dry) |
|---|---|
| Prevulcanized polymer latex | 90 |
| Natural rubber latex | 10 |
| Potassium hydroxide (10% aqueous solution) | 1 |
| Titanium dioxide (60% aqueous dispersion) | 10 |
| Zinc oxide (50% aqueous dispersion) | 5 |
| Trimene Base (50% aqueous solution) | 1 |

The natural rubber latex contained 60 percent dry rubber and 0.7 percent ammonia.

The compounded latex was used in the process for the production of rubber tape described in British Pat. Specification No. 957,014. The latex layer on the belt coagulated within 25 seconds and the tape so formed had sufficient wet gel strength to be separated with ease from the belt.

The untreated latex was also compounded as shown in Table XIX and used in the process of British Pat. Specification No. 957,014 under identical conditions. In this case the latex layer on the belt took 60 seconds to coagulate and the tape so formed had such poor wet gel strength that it tore easily while attempting to separate it from the belt.

EXAMPLE XXI

One kg of a 44 percent total solids latex of a styrene/butadiene rubber containing 46 percent styrene by mass (trade name Polystar Latex IV) was treated with 10 ml of 5 percent sodium tungstate solution and 20 ml of 100-volume hydrogen peroxide at room temperature (about 20° C). Dried films were prepared from both the resulting prevulcanized latex and the untreated latex, in each case after the addition of one part by weight of potassium oleate per 100 parts by weight of rubber, and tested as in Example V. The results of these tests are given in Table XX.

TABLE XX

| | Prevulcanized latex | Untreated latex |
|---|---|---|
| Modulus (kg/cm$^2$) at extension of: | | |
| 100% | 4 | 5 |
| 500% | 8 | 6 |
| Elongation-at-break (%) | 970 | 1140 |
| Tensile strength (kg/cm$^2$) | 18 | 7 |

EXAMPLE XXII

To 43.75 kg of the untreated styrene/butadiene rubber latex of Example V were added 450 g of 5 percent sodium tungstate solution and 1,810 ml of 100-volume hydrogen peroxide. The mixture was gently stirred for 28 hours during which its temperature was 18± 2° C. 590 ml of 10 percent potassium hydroxide solution were added to the resulting prevulcanized latex.

For the preparation of dipped articles, the treated latex was compounded as shown in Table XXI.

TABLE XXI

| | Parts by weight dry |
|---|---|
| Prevulcanized polymer latex | 50 |
| Natural rubber latex | 50 |
| Potassium hydroxide (20% aqueous solution) | 1 |
| Sulphur (50% aqueous dispersion) | 1 |
| 2,2'-methylene-bis(4-ethyl-6-t-butylphenol) (50% aqueous dispersion) | 1 |
| Titanium dioxide (60% aqueous dispersion) | 10 |
| Hepteen Base (30% aqueous emulsion) | 0.05 |
| Zinc salt of mercaptobenzthiazole (50% aqueous dispersion) | 1 |
| Zinc dibutyldithiocarbamate (50% aqueous dispersion) | 0.1 |
| Zinc oxide (50% aqueous dispersion) | 3 |

The natural rubber latex contained 60 percent dry rubber and 0.7 percent ammonia. Hepteen Base is a condensation product of heptaldehyde and aniline.

A metal balloon former was dipped into a coagulant solution consisting of 10 parts by weight of calcium nitrate tetrahydrate per 90 parts by weight of isopropanol and the deposit was dried. The former was dipped into a bath containing the compounded latex of Table XXI, slowly withdrawn from the bath and re-immersed in the coagulant solution for 30 seconds. The coagulated film on the former was washed and dried. The balloon was removed from the former without dificulty and was free from cracking. In a second experiment, the dried balloon on the former after being heated in steam at 100° C for 30 minutes was also found to be free from cracking.

For comparison, the untreated latex was compounded as shown in Table XXI and evaluated in identical manner to the prevulcanized latex. In the case of the untreated latex, the dried balloon was cracked and could not be removed from the former without tearing, and cracking was more severe after heating in steam.

EXAMPLE XXIII

To 4 kg of the untreated styrene/butadiene rubber latex of Example V were added 90 ml of saturated sodium borate solution and 80 ml of 100-volume hydrogen peroxide. The mixture was gently stirred for 3 hours during which its temperature was maintained at 30° C. Foaming was negligible.

Moulded foam rubber samples were prepared from the resulting treated latex using the formulation shown in Table XXII.

TABLE XXII

| | Parts by weight (dry) |
|---|---|
| Treated styrene/butadiene rubber latex | 100 |
| Sulphur (50% aqueous dispersion) | 2 |
| 2,2'-methylene-bis(4-ethyl-6t-butylphenol) (50% aqueous dispersion) | 1 |
| Zinc salt of mercaptobenzthiazole (50% aqueous dispersion) | 1.5 |
| Zinc diethyldithiocarbamate (50% aqueous dispersion) | 0.5 |

Ammonia (28% aqueous solution) equal to 0.05% NH$_3$ calculated on the latex mixing.

| | |
|---|---|
| Zinc oxide (50% aqueous dispersion) | 3 |
| Trimene Base (50% aqueous solution) | 1 |
| Sodium silicofluoride (30% aqueous dispersion) | 2 |

The zinc oxide, Trimene Base and sodium silicofluoride were added after mechanically foaming the latex and were thoroughly stirred in. The foam was poured into the molds measuring 8.5 × 6 × 3 cm and covered by a lid. It gelled 5 minutes after the addition of the sodium silicofluoride, the air temperature being 29° C. Seven minutes after gelling, the moulds were transferred to an oven and heated in steam at 100° C for 30 minutes. The moulds were then immersed in cold water and the foam rubber samples were removed, washed in cold water, passed through rubber-covered rollers to expel most of the water and dried in air at 55° C for 16 hours. The cellular structure of the samples was excellent.

Five frothings were carried out to produce foam rubber samples of different density. Two samples from each frothing were tested for density and modulus at 40 percent compression and then one sample from each frothing was cut into four test-pieces with the same dimensions for the measurement of tensile strength and elongation-at-break. The compression modulus was determined after compressing the sample by at least 60 percent 20 times. The tensile strength and elongation-at-break were measured at a rate of extension of 50 cm per minute.

The average density and average compression modulus obtained from each frothing were graphed and by interpolation the density at a compression modulus of 75 g/cm$^2$ was found to be 0.112 g/cm$^3$. The average tensile strength and the average elongation-at-break obtained from each frothing were plotted against the corresponding density and the tensile strength and elongation-at-break at a density of 0.112 g/cm$^3$ were found to be respectively 610 g/cm$^2$ and 170%.

For comparison, the untreated styrene/butadiene rubber latex of Example V was compounded as shown in Table XXII except that it was necessary to increase the amount of sodium silicofluoride from 2 to 3 parts by weight in order to obtain a gelling time of 6 mins. (at 27° C), and foam rubber samples were prepared, tested and evaluated in identical manner to the treated latex. The cellular structure of the samples was very good. The evaluation gave for a compression modulus of 75 g/cm$^2$ a foam density of 0.123 g/cm$^3$, a tensile strength of 520 g/cm$^2$ and an elongation-at-break of 190 percent.

Thus the foam rubber prepared from the treated latex showed a weight (density) saving of 9 percent, corresponding improvement in tensile strength of 17 percent and a corresponding decrease in elongation-at-break of only one-ninth, with respect to the foam rubber prepared from the untreated latex, which differences are consistent with the prevulcanized nature of the treated latex.

EXAMPLE XXIV

To 2 kg of the untreated styrene/butadiene rubber latex of Example V were added 40 ml of saturated sodium borate solution and 40 ml of 100-volume hydrogen peroxide and the mixture was gently stirred for 3 hours at 30° C.

The resulting treated latex was used in a latex/resin adhesive for bonding canvas to canvas, the adhesive being dried for 20 minutes at 120° C. Part of the canvas/canvas composite was aged for 100 hours at 70° C while the remainder was kept (unaged) at room temperature. The average peel strengths of the unaged and aged samples were then determined, in pounds force, on 2-inch strips at 2 inches per minute. For comparison, the untreated styrene/butadiene rubber latex was used and tested in identical manner. The results of the tests are given in Table XXIII.

TABLE XXIII

|  | Treated (lb force) | Untreated (lb force) |
|---|---|---|
| Unaged | 12.2 | 4.7 |
| Aged 100 hours at 70°C. | 17.6 | 12.7 |

EXAMPLE XXV

To 4 kg of the untreated styrene/butadiene rubber latex of Example V were added 80 ml of 5 percent lithium chloride solution and 80 ml of 100-volume hydrogen peroxide. The mixture was gently stirred for 3 hours during which its temperature was maintained at 30° C. The following day the pH of the treated latex was adjusted to 10.0 (which was the pH of the untreated latex) by addition of 10 percent potassium hydroxide solution. Foam rubber was prepared from the resulting treated latex using the formulation shown in Table XXIV.

TABLE XXIV

|  | Parts by weight dry |
|---|---|
| Treated styrene/butadiene rubber latex | 100 |
| Zinc oxide (50% aqueous dispersion) | 3 |
| 2,2'-methylene-bis(4-ethyl-6-t butylphenol (50% aqueous dispersion) | 1 |
| Trimene Base (50% aqueous solution) | 0.5 |
| Diisocyanate (trade name Suprasec DN) | 10 |
| Sodium silicofluoride (30% aqueous dispersion) | 3 |

The diisocyanate and sodium silicofluoride were added after mechanically foaming the latex to five times its original volume and were well stirred in. The foam was poured into a mould 1 cm deep and scraped level. It gelled 5 minutes after the addition of the sodium silicofluoride, the air temperature being 23° C. Ten minutes after gelling, the foam was removed from the mould and dried in air at 50° C for 16 hours. The sample had an excellent cellular structure and recovered from finger indentation within 5 seconds.

For comparison, the untreated styrene/butadiene rubber latex of Example V was compounded as shown in Table XXIV except that 2 parts by weight of sodium silicofluoride, instead of 3 parts by weight, were used to obtain a gelling time of 5 minutes (at 23° C), and foam rubber was prepared in identical manner to the treated latex. In this case, the foam was removed from the mould with difficulty, 10 minutes after gelling, and the dried sample still had not recovered 5 hours after finger indentation.

EXAMPLE XXVI

One kg of a 50 percent total solids latex of a styrene/butadiene rubber containing 50 percent styrene by weight (trade name Politone K.815) was treated with 10 ml of 5 percent lithium chloride solution and 20 ml of 100-volume hydrogen peroxide at room temperature (about 20° C).

For evaluation as a carpet backing latex, the resulting treated latex was compounded as shown in Table XXV.

TABLE XXV

|  | Parts by weight dry |
|---|---|
| Treated styrene/butadiene rubber latex | 100 |
| Stabilizer/wetting agent (45% aqueous solution)* | 0.5 |
| Tri-alpha-methylbenzylphenol (70% aqueous emulsion) | 1 |
| Filler (trade name Snowcal 3 ml) (78% aqueous dispersion) | 340 |
| Thickening agent (10% aqueous solution)** | 1 |

*Trade name Vulcastab HS
**Trade name Viscalex AH 10

The compounded latex, which had a total solids content of 69 percent, was spread on the back of tufted carpet at the rate of 1,030 g (wet weight) per square metre and dried at 120° C for 20 minutes. The resulting backed carpet had excellent handle and excellent resistance to cracking.

For comparison, the untreated styrene/butadiene rubber latex was compounded as shown in Table XXV and the compounded latex applied to the same tufted carpet in identical manner to the treated latex. In this case, the resulting backed carpet had good handle and good resistance to cracking, i.e., was less advantageous than the carpet backed with the treated latex compound.

Having now described our invention — what we claim is:

1. A method for the production of a prevulcanized latex of a rubbery polymer having improved tensile properties which comprises treating an unsaturated polymer having aliphatic olefinic double bonds in an aqueous medium with hydrogen peroxide together with a hydrogen peroxide activator which does not encourage the decomposition of the hydrogen peroxide to produce molecular oxygen under the conditions of the treatment, said activator being selected from the group consisting of inorganic and organic compounds which yield a compound selected from the group consisting of per-acids and per-salts by reaction with hydrogen peroxide in aqueous medium.

2. A method according to claim 1 in which the hydrogen peroxide is employed as an aqueous solution of concentration 5 to 65 per cent by mass.

3. A method according to claim 1 in which the activator is a compound selected from the class consisting of acidic and amphoteric inorganic oxides and salts thereof.

4. A method according to claim 1 in which the activator is a compound selected from (a) salts of sodium and potassium being molybdates, tungstates, stannates, borates, pervanadates, metasilicates, aluminates and bicarbonates, (b) lithium chloride and (c) boric acid.

5. A method according to claim 1 in which the amount of activator employed is at least 1 millimole per mole of hydrogen peroxide.

6. A method according to claim 1 in which the activator is selected from the class consisting of formic acid, formaldehyde and fluoroacetic acid.

7. A method according to claim 1 in which the said treatment is performed under conditions which minimise loss of oxygen.

8. A method according to claim 1 in which the said treatment is performed under acidic conditions.

9. A method according to claim 1 in which a complexing agent for metal ions is present during the treatment.

10. A method according to claim 1 in which the disodium salt of ethylenediamine tetra-acetic acid is present during the treatment.

11. A method according to claim 1 in which the unsaturated polymer is selected from the class consisting of styrene/butadiene copolymers, ethylene/propylene/diene terpolymers, polybutadienes, polychloroprenes, styrene/butadiene/vinylpyridine terpolymers, butadiene/acrylonitrile copolymers, isoprene/acrylonitrile copolymers, carboxylated styrene/butadiene copolymers and natural rubber.

12. A prevulcanized polymer latex when produced by a method according to claim 1.

13. A method according to claim 1, wherein said treatment is conducted at room temperature.

14. A method according to claim 1, wherein said treatment is conducted at a temperature of from about 16° to about 31° C.

* * * * *